US009481579B2

(12) United States Patent
Yoo et al.

(10) Patent No.: US 9,481,579 B2
(45) Date of Patent: Nov. 1, 2016

(54) METHOD FOR PREPARING A HYDROSILANE USING HETERO ATOM CONTAINING ACTIVATED CARBON

(71) Applicant: KOREA INSTITUTE OF SCIENCE AND TECHNOLOGY, Seoul (KR)

(72) Inventors: Bok Ryul Yoo, Seoul (KR); Joon Soo Han, Seoul (KR); Dong Won Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 48 days.

(21) Appl. No.: 14/582,700

(22) Filed: Dec. 24, 2014

(65) Prior Publication Data
US 2016/0115036 A1    Apr. 28, 2016

(30) Foreign Application Priority Data
Oct. 23, 2014    (KR) .......................... 10-2014-0143938

(51) Int. Cl.
| | |
|---|---|
| C01B 33/04 | (2006.01) |
| B01J 21/18 | (2006.01) |
| B01J 35/02 | (2006.01) |
| B01J 27/24 | (2006.01) |
| B01J 8/02 | (2006.01) |

(52) U.S. Cl.
CPC ................ *C01B 33/043* (2013.01); *B01J 8/02* (2013.01); *B01J 21/18* (2013.01); *B01J 27/24* (2013.01); *B01J 35/02* (2013.01); *B01J 2208/00256* (2013.01); *B01J 2208/024* (2013.01)

(58) Field of Classification Search
CPC ....................................................... C01B 33/04
USPC ........................................................ 423/347
See application file for complete search history.

(56) References Cited

U.S. PATENT DOCUMENTS

| | | | |
|---|---|---|---|
| 2,627,451 A | 2/1953 | Erickson et al. | |
| 2,732,280 A | 1/1956 | Bailey et al. | |
| 4,018,871 A | 4/1977 | Marin et al. | |
| 4,113,845 A | 9/1978 | Litteral | |

FOREIGN PATENT DOCUMENTS

| | | |
|---|---|---|
| JP | 6-92248 B | 11/1994 |
| WO | 83/03091 A1 | 9/1983 |

*Primary Examiner* — Edward Johnson
(74) *Attorney, Agent, or Firm* — Ladas & Parry LLP

(57) ABSTRACT

The present invention relates to a method for preparing a hydrosilane using heteroatom-containing activated carbon, more particularly to a method for economically preparing a high-purity hydrosilane by redistribution of a chlorosilane using a heteroatom-containing activated carbon catalyst.

10 Claims, 3 Drawing Sheets

METHOD FOR PREPARING A HYDROSILANE USING HETERO ATOM CONTAINING ACTIVATED CARBON

CROSS-REFERENCE TO RELATED APPLICATIONS

This application claims priority under 35 U.S.C. §119 to Korean Patent Application No. 10-2014-0143938, filed on Oct. 23, 2014, in the Korean Intellectual Property Office, the disclosure of which is incorporated herein by reference in its entirety.

BACKGROUND (a) Technical Field

The present invention relates to a method for preparing a hydrosilane using heteroatom-containing activated carbon, more particularly to a method for economically preparing a high-purity hydrosilane by redistribution of a chlorosilane using a heteroatom-containing activated carbon catalyst.

(b) Background Art

For preparation of a hydrosilane, a method of converting trichlorosilane to a hydrosilane such as dichlorosilane, monochlorosilane or silane by redistribution has been known from long ago.

For example, U.S. Pat. No. 2,732,280 introduced a method of preparing a hydrosilane by converting an alkyl trichlorosilane to an alkyl dichlorosilane or monosilane using a cyanamide catalyst. And, U.S. Pat. No. 4,018,871 disclosed a method of preparing a 10 mol % dichlorosilane in 6-7 hours from trichlorosilane using 10 w % of α-pyrrolidone as a catalyst.

However, these methods are inapplicable to large-scale production because a cyanamide monomer or a pyrrolidone monomer is used and, thus, it is difficult to establish a continuous process.

Later, U.S. Pat. No. 4,113,845 presented a method of preparing dichlorosilane and monosilane by disproportionation of trichlorosilane or dichlorosilane in a fixed bed reactor filled with an anion exchange resin containing a tertiary amine or a quaternary ammonium salt.

However, this method has the problems that the reaction temperature is limited to 150° C. or lower, deformation of the organic catalyst may occur because of low thermal stability and a quaternary ammonium salt produced from decomposition of the catalyst may lead to contamination of the reactor.

Meanwhile, U.S. Pat. No. 2,627,451 disclosed a method of preparing a hydrosilane by converting trichlorosilane to dichlorosilane with a yield of 1-10 mol % using an inorganic catalyst such as aluminum trichloride, iron trichloride or boron trifluoride.

However, this method requires a lot of energy, with the reaction temperature ranging from 250 to 450° C., and a high pressure has to be maintained in the reactor because the chlorosilanes have low boiling points. In addition, since the catalyst is a major contaminant of a silicon-based semiconductor, the main product prepared from the silane, an additional purification process is required during redistribution.

REFERENCES OF THE RELATED ART

Patent Documents (Patent document 1) U.S. Pat. No. 2,732,280.
(Patent document 2) U.S. Pat. No. 4,018,871.
(Patent document 3) U.S. Pat. No. 4,113,845.
(Patent document 4) U.S. Pat. No. 2,627,451.

SUMMARY

As a result of consistent researches to solve the problems of the existing techniques, the inventors of the present invention have found out that a high-purity hydrosilane can be prepared from a chlorosilane via a continuous gas-phase reaction by using heteroatom-containing activated carbon as a catalyst.

The present invention is directed to providing a method for preparing heteroatom-containing activated carbon and preparing a high-purity hydrosilane from a chlorosilane having a Si—H bond with high yield by using the same as a catalyst.

The present invention is also directed to providing a method for economically preparing a high-purity hydrosilane from a chlorosilane in large scale via a continuous process.

The present invention is also directed to providing an apparatus for preparing a hydrosilane which allows for preparation of a high-purity hydrosilane from a chlorosilane via a continuous process.

In an aspect, the present invention provides a method for preparing a hydrosilane represented by Chemical Formula 2 by redistribution of a chlorosilane represented by Chemical Formula 1 using heteroatom-containing activated carbon as a catalyst:

[Chemical Formula 1]

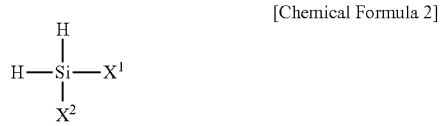

[Chemical Formula 2]

wherein each of $X^1$ and $X^2$, which may be identical or different, is independently hydrogen or chlorine.

In another aspect, the present invention provides an apparatus for preparing a hydrosilane, including: a preheater into which a chlorosilane is injected and in which the chlorosilane is vaporized; a reactor which is connected to the preheater and is filled with heteroatom-containing activated carbon as a catalyst and in which redistribution of the chlorosilane supplied from the preheater occurs; a cooler which cools a hydrosilane obtained from the redistribution reaction; and a collector which collects the hydrosilane cooled by the cooler.

The method for preparing a hydrosilane according to the present invention, wherein an activated carbon catalyst prepared using a heteroatom-containing resin is used as a catalyst, provides superior thermal stability and allows for preparation of a high-purity hydrosilane with high yield by reducing contamination of a reactor.

Also, use of the novel inorganic catalyst allows for application to large-scale production by reducing reaction time with a chlorosilane and enabling a continuous process.

In addition, since an additional purification process is unnecessary, a hydrosilane can be prepared economically via a continuous process which is very simple and convenient.

DETAILED DESCRIPTION OF MAIN ELEMENTS

Figure 1:
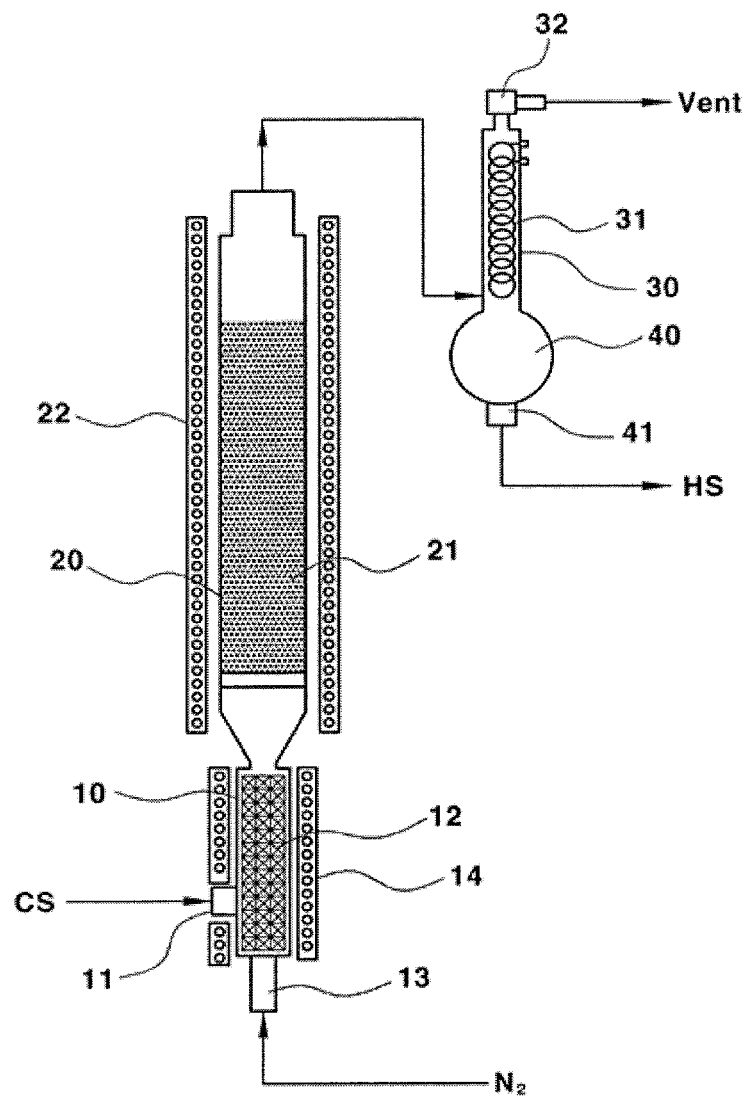
FIG. 1 schematically shows an exemplary apparatus for preparing a hydrosilane applicable to a method for preparing a hydrosilane according to the present invention.

10: preheater
11: chlorosilane inlet
12: filler
13: inert gas inlet
14: heating means
20: reactor
21: heteroatom-containing activated carbon
22: heating means
30: cooler
31: cooling means
32: gas outlet
40: collector
41: hydrosilane outlet

DETAILED DESCRIPTION

Hereinafter, exemplary embodiments of the present invention will be described in detail.

The present invention relates to a method for preparing a high-purity hydrosilane from a chlorosilane by redistribution using heteroatom-containing activated carbon as a catalyst.

A chlorosilane of Chemical Formula 1 used as a starting material in the present invention may be trichlorosilane, dichlorosilane or monochlorosilane. More specifically, it may be trichlorosilane or dichlorosilane.

In the present invention, heteroatom-containing activated carbon is used as a catalyst in the preparation of a hydrosilane by redistribution of the chlorosilane. The activated carbon may be a commonly used one. More specifically, spherical activated carbon may be used.

The activated carbon may be prepared using a resin containing one or more of a group 15 heteroatom such as nitrogen, phosphorus, etc. or a group 16 heteroatom such as oxygen, etc., having an unshared electron pair. Specifically, a resin precursor containing a group 15 heteroatom, more specifically nitrogen, phosphorus or a combination thereof, may be used. However, the heteroatom contained in the activated carbon is not necessarily limited thereto.

The heteroatom-containing activated carbon according to the present invention, i.e., a catalyst for preparing a hydrosilane, may be prepared by carbonizing the heteroatom-containing resin at high temperature and activating the same.

Typically, the heteroatom-containing activated carbon catalyst prepared according to the present invention may have 0.001-15 wt % of the heteroatom embedded in the activated carbon, based on the total weight of the catalyst. More specifically, the heteroatom may be embedded with a content of 0.01-10 wt %. If the content of the heteroatom is smaller, catalytic activity may decrease. And, a greater content is economically undesirable.

Accordingly, the present invention provides a catalyst for preparing a hydrosilane, which contains 0.001-10 wt % of a heteroatom based on the total weight of the catalyst.

The redistribution reaction occurring in the presence of the heteroatom-containing activated carbon catalyst according to the present invention is a gas-phase reaction and it is necessary to effectively heat the chlorosilane to maintain the gas-phase reaction. The redistribution may be conducted at a reaction temperature of 40-500° C., more specifically 50-300° C. Most specifically, the redistribution may be conducted at a reaction temperature of 100-250° C. while maintaining the stability of the catalyst. If the reaction temperature is too low, the reaction time is prolonged and the conversion efficiency is decreased. And, too high a reaction temperature is disadvantageous economically although the reaction rate and the conversion efficiency are improved.

Specifically, the redistribution may be conducted at a reaction pressure of 1-10 bar.

As an exemplary embodiment of the preparation of a hydrosilane by redistribution of a chlorosilane using a heteroatom-containing activated carbon according to the present invention, preparation of a hydrosilane from trichlorosilane may be represented by Scheme 1.

[Scheme 1]

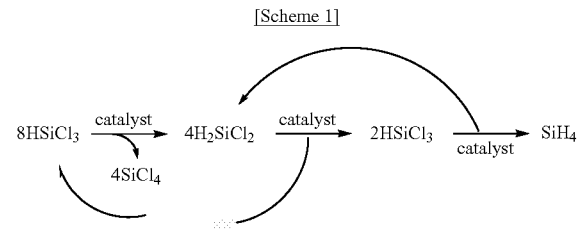

$$8HSiCl_3 \xrightarrow{catalyst} 4H_2SiCl_2 + 4SiCl_4 \xrightarrow{catalyst} 2HSiCl_3 \xrightarrow{catalyst} SiH_4$$

The method for preparing a hydrosilane according to the present invention may further include, before the redistribution, vaporizing the chlorosilane by preheating. The preheating may be conducted specifically at 40-300° C., more specifically at 100-250° C.

The method for preparing a hydrosilane according to the present invention may further include, after the redistribution, cooling the hydrosilane. Specifically, the cooling may be conducted at −15° C. or below.

As a result, the hydrosilane represented by Chemical Formula 2 may be obtained. The hydrosilane prepared in the present invention may be in the form of dichlorosilane, chlorosilane or silane. For example, by redistributing trichlorosilane using the heteroatom-containing activated carbon as a catalyst, dichlorosilane may be obtained with high purity, high conversion rate and high yield.

The preparation of a hydrosilane according to the present invention is applicable to large-scale production unlike the existing method, because the inorganic material (carbon support), i.e., the heteroatom-containing activated carbon, has superior thermal stability and the hydrosilane can be prepared via a continuous process while injecting the chlorosilane to the catalyst.

In addition, the use of the inorganic catalyst leads to decreased contamination of a reactor owing to the superior thermal stability of the catalyst. Furthermore, because an organic support having an amine functional group, which is a contaminant of silane (through decomposition of the amine) or $AlCl_3$, $BF_3$, $FeCl_2$, etc. is not used, a high-purity silane can be prepared without an additional purification process.

As such, the method for preparing a hydrosilane according to the present invention is not only economical because of the simple redistribution process of a chlorosilane and decreased reaction time but also allows for preparation of a high-purity hydrosilane with high yield because of high conversion rate.

The present invention also provides an apparatus for preparing a hydrosilane using heteroatom-containing activated carbon which is suitable for use in the method for preparing a hydrosilane according to the present invention.

FIG. 1 shows an apparatus for preparing a hydrosilane according to an exemplary embodiment of the present invention.

The apparatus for preparing a hydrosilane according to an exemplary embodiment of the present invention will be described referring to FIG. 1.

The apparatus for preparing a hydrosilane of the present invention may include a preheater 10, a reactor 20, a cooler 30 and a collector 40.

Specifically, as shown in FIG. 1, the apparatus may include: a preheater 10 into which a chlorosilane is injected; a reactor 20 which is connected to the preheater 10 and is filled with heteroatom-containing activated carbon 21 as a catalyst and in which redistribution of the chlorosilane supplied from the preheater 10 occurs; a cooler 30 which cools a hydrosilane obtained from the redistribution reaction; and a collector 40 which collects the hydrosilane cooled by the cooler.

The preheater 10 may have a tubular shape and may be filled with a filler 12 so as to transfer heat well such that the chlorosilane supplied from a chlorosilane inlet 11 is vaporized easily. For example, a commonly used heat-conducting filler material, glass bead, etc. may be used as the filler 12. In addition, the preheater 10 may be equipped with an inert gas inlet 13 and an inert gas may be injected therethrough. The inert gas may be, for example, argon, helium or nitrogen gas. The preheater 10 may be equipped with a heating means 14 and also may be equipped with a temperature controller. For example, if the preheater 10 has a cylindrical shape, its height may be 0.5-3 times of its inner diameter. Specifically, the preheater 10 may be made a glass tube, a stainless tube, a quartz tube, etc. Specifically, the chlorosilane may be injected to the preheater 10 at a rate of 2-200 WHSV (weight hourly space velocity). Inexpensive nitrogen may be injected as the inert gas.

The chlorosilane vaporized in the preheater 10 is supplied to the reactor 20 which may also have a tubular shape. The reactor 20 is filled with the heteroatom-containing activated carbon 21 as a catalyst. After the vaporized chlorosilane contacts with the catalyst and is redistributed, it is supplied to the cooler 30 located at the opposite side of the chlorosilane inlet 11. The heteroatom-containing activated carbon 21 may be filled in the reactor 20 with an amount of about 5-90 vol %, specifically about 40-80 vol %. The reactor 20 is equipped with a heating means 22 so as to maintain the chlorosilane redistribution temperature. The reactor 20 may have a tubular shape with an outer diameter to length ratio of 1:2-10. Specifically, a glass tube, a stainless tube, a quartz tube, etc. may be used. The reactor 20 may be further equipped with a temperature controller, a thermometer, etc.

The hydrosilane obtained from the reaction in the reactor 20 is transferred to the cooler 30. The hydrosilane is cooled by a cooling means 31 and collected by the collector 40. The cooler 30 is equipped with a gas outlet 32 so that a gas remaining after the reaction such as the inert gas is discharged therethrough.

The hydrosilane cooled by the cooler 30 is collected by the collector 40. The collector 40 may be formed integrally with the cooler 30 as shown in FIG. 1 or may be formed separately. The collector 40 may be equipped with a hydrosilane outlet 41 such that the collected hydrosilane can be taken out or transferred to another apparatus.

The apparatus for preparing a hydrosilane according to the present invention is for use in the method for preparing a hydrosilane according to the present invention.

By using the apparatus for preparing a hydrosilane according to the present invention in the preparation method of the present invention, a hydrosilane can be prepared very quickly with high yield and with high conversion rate via a continuous process. In particular, the use of the new catalyst allows for economical production of hydrosilane and the continuous preparation process is easily applicable to large-scale production.

Accordingly, the high-purity hydrosilane prepared according to the present invention is very suitable for use as monosilane as a high-purity precursor used in the general high-purity polysilicon preparation process (particularly, the FBR process) and semiconductor manufacturing process. In addition, since the high-purity monosilane precursor has a decomposition temperature of 700° C., which is lower than the decomposition temperature 1150° C. of trichlorosilane used in the Siemens process, and is applicable to a continuous process, the present invention is industrially very useful in the preparation of a high-purity hydrosilane that can decrease the production cost of polysilicon.

The present invention will be described in more detail through examples. The following examples are for illustrative purposes only and it will be apparent to those skilled in the art not that the scope of this invention is not limited by the examples.

Preparation Example 1

Preparation of Activated Carbon Using Pyridine-Based Resin 55 g of a pyridine-based resin (poly(4-vinylpyridine) 2%, divinylbenezene 2%: DVB-PVP) was stabilized for 5 hours by heating at 300° C. at a rate of 1° C./m Loss on heat treatment was about 70% and about 38.7 g of a heat-stabilized sample was obtained. The heat-stabilized sample was carbonized by heating under nitrogen atmosphere for 30 minutes at 950° C. at a rate of 3° C./min. 11.5 g of a carbonized sample was obtained, which was activated by heating for 30 minutes at 950° C. while supplying steam and nitrogen. As a result, 9.2 g of activated carbon (N content: 4.4 wt %) was obtained.

Figure 2:
FIG. 2 shows SEM images of activated carbon containing 4.4 wt % of nitrogen (N) prepared in Preparation Example 1.
Figure 2:
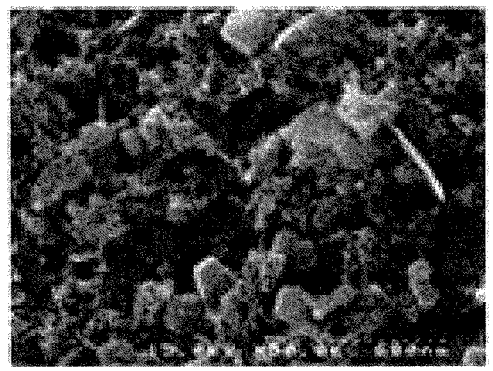

FIG. 2 shows SEM images of the activated carbon prepared using the pyridine-based resin.

Preparation Example 2

Preparation of Activated Carbon Using Pyrrolidone-Based Resin 80 g of a pyrrolidone-based resin (polyvinylpyrrolidone average Mw 40,000; PVPD) was stabilized for 5 hours by heating at 300° C. at a rate of 1° C./min. Loss on heat treatment was about 90% and about 72.1 g of a heat-stabilized sample was obtained. The heat-stabilized sample was carbonized by heating under nitrogen atmosphere for 30 minutes at 950° C. at a rate of 3° C./min. 6.2 g of a carbonized sample was obtained, which was activated by heating for 30 minutes at 950° C. while supplying steam and nitrogen. As a result, 2.7 g of activated carbon (N content: 3.4 wt %) was obtained.

Figure 3:
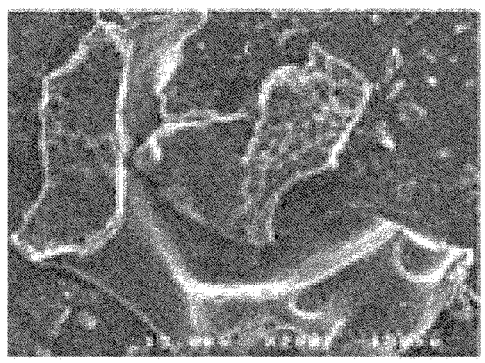
FIG. 3 shows SEM images of activated carbon containing 3.4 wt % of nitrogen (N) prepared in Preparation Example 2.
Figure 3:
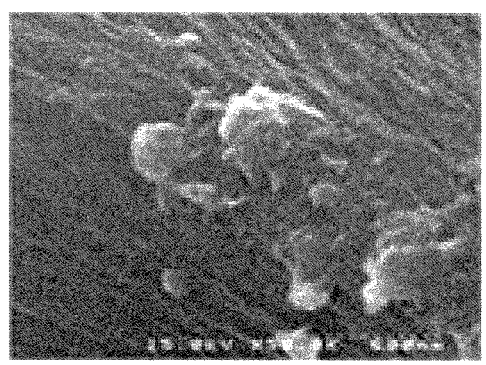

FIG. 3 shows SEM images of the activated carbon prepared using the pyrrolidone-based resin.

Example 1

Redistribution of a chlorosilane containing a Si—H bond was performed by filling the heteroatom-containing activated carbon catalyst in a reaction apparatus as shown in FIG. 1.

A Pyrex glass tube with an inner diameter of 37 mm and a height of 45 mm, as a preheating tube, was filled with a filler (Cannon 316SS). A heating wire was wound around the glass tube and temperature was controlled using an automatic temperature controller. A quartz tube with an outer diameter of 10 mm and a length of 80 cm was used as a reactor. A thermocouple (K type, chromel-alumel) was equipped at the center to measure the temperature of the reactor. The temperature of the tubular preheater (preheating tube) was maintained lower than that of the reactor and a collector was maintained at −20° C. using a cooler.

After filling 5 g of the activated carbon catalyst in the reactor, reaction was conducted while supplying nitrogen gas at a rate of 1 mL/min and supplying a chlorosilane at varying rates (0.1-5.0 mL/min or 1.6-81 WHSV).

The result of conducting redistribution of trichlorosilane at different reaction temperatures using the activated carbon catalyst synthesized in Preparation Example 1 using the pyridine-based resin is shown in Table 1.

Example 2

Redistribution of trichlorosilane was conducted using the same apparatus and method as in Example 1, using the activated carbon catalyst synthesized in Preparation Example 2 using the pyrrolidone-based resin. The result is also shown in Table 1.

Comparative Example 1

Redistribution of trichlorosilane was conducted as in Example 1, using activated carbon synthesized using a heteroatom-free polystyrene resin. The result is also shown in Table 1.

TABLE 1

| $SiCl_3$ supply rate (WHSV) | Reaction temperature (° C.) | (Comparative Example 1) Activated carbon synthesized using polystyrene resin | | | (Example 1) Activated carbon synthesized using pyridine resin | | | (Example 2) Activated carbon synthesized using pyrrolidone resin | | |
|---|---|---|---|---|---|---|---|---|---|---|
| | | $H_2SiCl_2$ (mol %) | $HSiCl_3$ (mol %) | $SiCl_4$ (mol %) | $H_2SiCl_2$ (mol %) | $HHSiCl_3$ (mol %) | $SiCl_4$ (mol %) | $H_2SiCl_2$ (mol %) | $HSiCl_3$ (mol %) | $SiCl_4$ (mol %) |
| 8 | 100 | 0.1 | 99.6 | 0.2 | 8.1 | 79.1 | 12.2 | 7.7 | 80.4 | 11.2 |
| 16 | 200 | 0.1 | 99.5 | 0.3 | 8.9 | 71.1 | 15.1 | 8.4 | 78.0 | 12.6 |
| 40 | 300 | — | 99.5 | 0.4 | 8.2 | 74.4 | 16.4 | 7.2 | 81.3 | 10.2 |

Comparative Example 2

A hydrosilane was prepared as in Example 1, using activated carbon synthesized using a heteroatom-free styrene-based resin while varying reaction temperatures.

Redistribution was conducted using the same apparatus and method as in Example 1, using a catalyst prepared using the Amberlyst A21 resin (5 g, N content: 6.4%).

The result is compared with that of the activated carbon catalyst synthesized using the pyridine-based resin in Table 2.

TABLE 2

| $HSiCl_3$ supply rate (WHSV) | Reaction temperature (° C.) | (Comparative Example 2) Amberlyst A21 | | | (Example 1) Activated carbon synthesized using pyridine-based resin | | |
|---|---|---|---|---|---|---|---|
| | | $H_2SiCl_2$ (mol %) | $HSiCl_3$ (mol %) | $SiCl_4$ (mol %) | $H_2SiCl_2$ (mol %) | $HSiCl_3$ (mol %) | $SiCl_4$ (mol %) |
| 8 | 50 | 6.3 | 87.8 | 6.9 | 7.1 | 82.5 | 9.8 |
| 16 | 100 | 11.1 | 77.4 | 11.5 | 8.4 | 77.6 | 12.2 |
| 40 | 200 | — | — | — | 8.9 | 71.1 | 15.1 |
| 50 | 300 | — | — | — | 8.2 | 74.4 | 16.4 |

It can be seen that, whereas the existing tertiary amine catalyst did not function as a catalyst at temperatures above 130° C. due to thermal decomposition (Comparative Example 2), the heteroatom-containing activated carbon was thermally stable and exhibited high conversion efficiency even at high reaction temperatures and with short contact time (Examples 1 and 2). Accordingly, it can be used to prepare a high-purity hydrosilane such as dichlorosilane and monosilane from a chlorosilane, with high yield in large scale.

In particular, the high-purity hydrosilane prepared according to the present invention is very suitable to be used to prepare monosilane as a precursor in the preparation of a high-purity polysilicon via the FBR process.

In addition, it can be usefully applied for a continuous process for preparing polysilicon.

What is claimed is:

1. A method for preparing a hydrosilane represented by Chemical Formula 2 by redistribution of a chlorosilane represented by Chemical Formula 1 using heteroatom-containing activated carbon as a catalyst:

[Chemical Formula 1]

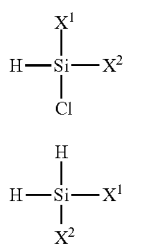

[Chemical Formula 2]

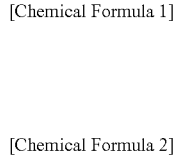

wherein each of $X^1$ and $X^2$, which may be identical or different, is independently hydrogen or chlorine.

2. The method for preparing a hydrosilane according to claim 1, wherein the chlorosilane is trichlorosilane or dichlorosilane.

3. The method for preparing a hydrosilane according to claim 1, wherein the heteroatom-containing activated carbon comprises 0.01-15 wt % of a group 15 heteroatom having an unshared electron pair based on the total weight of the catalyst.

4. The method for preparing a hydrosilane according to claim 1 or 3, wherein the heteroatom is nitrogen, phosphorus or a combination thereof.

5. The method for preparing a hydrosilane according to claim 1, wherein the redistribution is conducted at a reaction temperature of 40-500° C.

6. The method for preparing a hydrosilane according to claim 5, wherein the redistribution is conducted at a reaction temperature of 150-300° C. while maintaining the stability of the catalyst.

7. The method for preparing a hydrosilane according to claim 1, wherein the redistribution is conducted at a reaction pressure of 1-10 bar.

8. The method for preparing a hydrosilane according to claim 1, which further comprises, before the redistribution, vaporizing the chlorosilane by preheating to 40-300° C.

9. The method for preparing a hydrosilane according to claim 1, which further comprises, after the redistribution, cooling the hydrosilane.

10. The method for preparing a hydrosilane according to claim 1, wherein the reaction is conducted while supplying the chlorosilane at a rate of 2-200 WHSV based on the amount of the catalyst.

* * * * *